United States Patent Office 2,745,729
Patented May 15, 1956

2,745,729

HERBICIDAL COMPOSITION

David T. Mowry, Kirkwood, Mo., and Arthur H. Schlesinger, Dayton, Ohio, assignors to Monsanto Chemical Company, St. Louis, Mo., a corporation of Delaware No Drawing. Application January 16, 1953,
Serial No. 331,724

2 Claims. (Cl. 71—2.6)

The present invention relates to herbicides and deals more particularly with methods for the general destruction of undesired plants.

We have found that very efficient herbicidal compositions are obtained by employing allyl phthalate as the active ingredient.

Particularly active herbicidal compositions are obtained by preparing oil-in-water emulsions of the phthalate. The emulsions may be obtained by first dissolving the ester in an organic material which is a solvent therefor and then mixing the organic solution with water in the presence of an emulsifying agent. Because of the high toxicity of the present ester against living plants and the efficiency with which organic solutions of the same may be dispersed in an aqueous vehicle, extremely good herbicidal properties are evidenced with only very small concentrations of the diallyl phthalate, say, at concentrations of from 0.1 per cent to 2 per cent by weight of the total weight of the emulsion.

Emulsifying agents which may be employed are those customarily used in the art for the preparation of oil-in-water emulsions, e. g. ionic or non-ionic emulsifying or dispersing agents such as the long-chained alkyl benzenesulfonates or polyglycol ethers. The emulsifying agents are likewise employed in only very small concentrations, say, from 0.5 per cent to 1.0 per cent by weight of the total weight of the emulsion.

The present invention is further illustrated, but not limited, by the following examples:

Example 1

Allyl phthalate and some related compounds were tested for herbicidal efficacy as follows:

A cyclohexanone solution of each of the compounds shown below and an emulsifying agent were added to water, the quantity of solution employed being calculated to give emulsions containing 1.0 per cent respectively, of the test compound, based on the total weight of each emulsion. The quantity of emulsifying agent used was 0.2 per cent by weight, based on the total weight of each emulsion. The emulsifying agent comprised a mixture of a polyalkylene glycol derivative and an alkyl benzenesulfonate.

Three week old corn and bean plants were respectively sprayed with each emulsion, two plants of each variety being employed. The spraying was continued until droplets formed on and/or fell from the foliage and stems of the sprayed plants, up to 15 ml. of the emulsion being applied to each plant. The sprayed plants as well as two untreated "blank specimens" of each plant were then allowed to remain under standard conditions of sunlight and watering for a period of one week. At the end of that time the sprayed plants were compared with the untreated plants in order to determine the extent of injury, if any. The following results were obtained:

| Compound Tested | Effect [1] on— | |
|---|---|---|
| | Bean | Corn |
| Diallyl phthalate | 4, 4a | 4, 4a |
| Methyl phthalate | 0 | 0 |
| Allyl N-methylcarbamate | 0 | 0 |
| Allyl thionocarbamate | 0 | 0 |
| Allyl sulfide | 0 | 1 |

[1] 4=plant dead; 4a=leaves dried; 1=slight injury; 0=no injury.

The above results show that while neither allyl compounds, generally, nor phthalates, generally, possess herbicidal efficacy, allyl phthalates has pronounced plant-killing action.

Example 2

Another method of testing for herbicidal efficiency of a chemical involves noting the effects on seed germination and plant growth which may be evidenced by spraying soil surfaces. This test, commonly known as a "pre-emergence test" was conducted as follows:

Boxes having a 5" x 5" exposed area were partially filled with a layer of soil and 20 seeds were placed thereon and then covered with a ¼" to ½" layer of soil which had been screened to ¼" sieve. Test boxes containing 20 seeds each of radish, buckwheat, beet and mustard seeds, respectively, were prepared. The surface soil of the seeded boxes was then sprayed with the 1.0 per cent emulsion of allyl phthalate of Example 1. The quantity of emulsion which was applied was calculated to correspond to 50 lbs. of the phthalate per acre. In the present instance, 9.1 cc. of the 1.0 per cent emulsion per 25 square inches of surface soil was calculated to correspond to 50 lbs. of the chemical per acre. The sprayed boxes as well as similarly seeded, but unsprayed, boxes were then maintained at standard conditions of temperature and watering for a period of two weeks. At the end of that time the number of healthy seedlings in each box was counted. Thus the number of non-emerging and damaged seedlings was obtained by difference. This difference is designated as "X." "Per cent phytotoxicity" was determined by the ratio of "X" to the number of healthy seedlings in the controls.

There was evidenced a 71–100 per cent phytotoxicity of the allyl phthalate to all four test specimens at the 50 lbs. per acre rate of application.

While allyl phthalate is most advantageously employed as a herbicide by incorporating it into emulsions as herein described, it may be employed also in other plant destroying methods. Thus it may be incorporated into solid carriers such as clay, talc, pumice and bentonite to give herbicidal compositions which may be applied to living plants or to surfaces which are to be freed from plant growth. The allyl phthalate may also be mixed with liquid or solid agricultural pesticides, e. g., insecticides and fungicides. While solutions of the phthalate in organic solvents may be employed for preventing and destroying plant growth, we have found that the emulsions possess an improved tendency to adhere to the treated surfaces and that less of the active ingredient is required to give comparable herbicidal efficiency.

Allyl phthalate may be used to destroy already existing plant growth by application to plants, or it may be employed to prevent the plant growth by application to media normally supporting plant growth, e. g., water, soils, etc. The effective quantity of the allyl phthalate varies somewhat with the manner of application and nature of the growth media. A few pounds, i. e., from ten to sixty pounds per acre is generally sufficient to retard plant growth when application is to soil surfaces. Less is required when the phthalate is incorporated into the soil.

What we claim is:

1. The method of preventing plant growth which comprises applying allyl phthalate to media normally supporting said growth, said phthalate being applied to said media in a quantity which prevents plant growth.

2. The method of preventing plant growth which comprises applying allyl phthalate to surfaces of soils normally supporting said growth, said phthalate being applied to said soils in a quantity which prevents plant growth.

References Cited in the file of this patent

UNITED STATES PATENTS

| | | |
|---|---|---|
| 2,217,673 | Coleman et al. | Oct. 15, 1940 |
| 2,390,941 | Jones | Dec. 11, 1945 |
| 2,567,987 | Baumgartner | Sept. 18, 1951 |

OTHER REFERENCES

"Science," Feb. 29, 1952, page 236.